(12) United States Patent
Watanabe et al.

(10) Patent No.: US 10,712,147 B2
(45) Date of Patent: Jul. 14, 2020

(54) MEASUREMENT SYSTEM AND METHOD OF MANUFACTURING SHAFT WITH HOLE

(71) Applicant: Hitachi Metals, Ltd., Minato-ku, Tokyo (JP)

(72) Inventors: Masahiro Watanabe, Tokyo (JP); Koji Utsumi, Tokyo (JP); Shigeyoshi Fujihara, Tokyo (JP); Yusuke Omuro, Tokyo (JP); Shinji Kayama, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 16/555,110

(22) Filed: Aug. 29, 2019

(65) Prior Publication Data

US 2020/0103219 A1    Apr. 2, 2020

(30) Foreign Application Priority Data

Sep. 27, 2018    (JP) .................................. 2018-181455

(51) Int. Cl.
G01B 11/06 (2006.01)
G01B 11/12 (2006.01)

(52) U.S. Cl.
CPC .............. *G01B 11/06* (2013.01); *G01B 11/12* (2013.01)

(58) Field of Classification Search
CPC ........... G01N 21/31; G01N 2021/8967; G01N 21/896; G01N 1/2813; G01N 21/8422; G01N 21/87; G01N 2223/419; G01N 2223/5055; G01N 23/046; G01N 35/1009; G01N 9/24; G01N 15/06;
(Continued)

(56) References Cited

U.S. PATENT DOCUMENTS 5,259,716 A * 11/1993 Hoshino ................. B29C 49/78
                                                          198/394
6,975,410 B1 * 12/2005 Sturgill .................. G01B 11/06
                                                          356/631
(Continued)

FOREIGN PATENT DOCUMENTS

| EP | 2 905 576 A1 | 8/2015 |
| EP | 3 351 894 A1 | 7/2018 |
| JP | 2013-164273 A | 8/2013 |

OTHER PUBLICATIONS

Extended European Search Report issued in European Application No. 19194827.2 dated Feb. 20, 2020 (nine (9) pages).

*Primary Examiner* — Michael P Stafira
(74) *Attorney, Agent, or Firm* — Crowell & Moring LLP (57) ABSTRACT

A measurement system includes a measuring instrument, a measurement control device, and a ranging device. The measuring instrument includes a base that is to be fixed to a tool shaft of a machining apparatus, a first rod and a second rod that are connected to the base, and a first measuring head and a second measuring head that are fixed to the respective rods and irradiate an object to be measured with measurement light. The measurement control device acquires a distance I between the first measuring head and an inner peripheral surface of the hole of the object to be measured, and a distance O between the second measuring head and an outer peripheral surface of the object from the ranging device, and calculates the thickness of the object on the basis of the distance I, the distance O, and a distance between the first and second measuring heads.

11 Claims, 8 Drawing Sheets (58) Field of Classification Search
CPC ... G01N 2015/0693; G01N 2021/0364; G01N 2021/216; G01N 2021/3129; G01N 2021/8416; G01N 2021/8427; G01N 2021/8438; G01N 2021/8883; G01N 21/03; G01N 21/21; G01N 21/255; G01N 21/59; G01N 21/88; G01N 21/8806; G01N 21/8851; G01N 21/9054; G01N 21/8914; G01N 21/958; G01N 2201/062; G01N 2223/03; G01N 2223/052; G01N 2223/401; G01N 2223/646; G01N 23/04; G01N 25/00; G01N 33/4833; G01B 11/06; G01B 11/08; G01B 11/026; G01B 11/0633; G01B 11/12; G01B 11/168; G01B 11/0691; G01B 1/00; G01B 21/06; G01J 2004/001; G01J 4/00; G02B 27/1006; G02B 21/1086; G02B 5/1866; G02B 5/223; G02B 5/26; G02B 5/283; G02B 5/285; G02B 6/0036; G02B 6/0038; G02B 6/0053; G02B 6/0066; G02B 6/0088; G02B 6/29311; G02B 6/4215; G02B 6/44

See application file for complete search history.

(56) References Cited

U.S. PATENT DOCUMENTS

| | | | |
|---|---|---|---|
| 2012/0230579 A1* | 9/2012 | Oikawa | G01N 21/954 382/152 |
| 2013/0333531 A1 | 12/2013 | Koll | |
| 2015/0015695 A1 | 1/2015 | Baba et al. | |
| 2015/0204654 A1* | 7/2015 | Fiorentini | G01B 9/02037 356/630 |
| 2018/0356288 A1* | 12/2018 | Segall | G01J 5/0066 |
| 2019/0170665 A1* | 6/2019 | Kaneko | G01N 23/04 |

* cited by examiner

MEASUREMENT SYSTEM AND METHOD OF MANUFACTURING SHAFT WITH HOLE

BACKGROUND OF THE INVENTION

1. Field of the Invention

The present invention relates to a method and system for measuring an object that is a shaft with a hole, such as a hollow (also referred to as a through-hole) shaft or a shaft with a blind hole, and a method of manufacturing the object.

2. Description of the Related Art

In the past, ends of the shaft could be measured with a micrometer or the like in a case where the axis of the inner periphery of a hollow shaft or a shaft with a blind hole and the axis of the outer periphery thereof need to accurately coincide with each other. However, since a measuring instrument cannot enter the middle portion of the shaft, an effort to measure a thickness with ultrasonic waves has been required to measure the degree of coincidence of axes.

There is a device disclosed in JP 2013-164273 A as a device that can measure the inner diameter of a hollow shaft. The device includes a measuring head that is held at an end of a rod, is to be inserted into a work, and optically measures an inner cross-sectional shape of an object using a laser and a camera; or a measuring head that can scan the inner cross-sectional surface by the rotation of a contact displacement meter.

In JP 2013-164273 A, only the inner diameter of a hollow shaft was measured in a technique disclosed and the thickness of the hollow shaft could not be measured.

Meanwhile, since the propagation speed of ultrasonic waves is changed due to a variation in material in a technique as the method in the related art that applies ultrasonic waves from the outer periphery and directly measures a thickness from the propagation time of ultrasonic waves reflected on the inner periphery, there is a problem that the technique has an error of an order of 0.1 mm. In addition, since the surface of a material needs to be smoothly machined to apply ultrasonic waves to the material, there is also a problem that an additional process is required to measure a thickness.

SUMMARY OF THE INVENTION

The invention has been made in consideration of the above-mentioned circumstances, and an object of the invention is to provide a system that can accurately measure the thickness of a shaft with a hole, and a method of manufacturing a shaft with a hole. Other objects of the invention will become clear in embodiments.

A measurement system of the invention includes a measuring instrument, a measurement control device, and a ranging device that is connected to the measurement control device. The measuring instrument includes: a base that is to be fixed to a tool shaft, a cutter holder, or a tailstock of the machining apparatus; a first rod and a second rod that are connected to the base; and a first measuring head and a second measuring head that are fixed to the respective rods and irradiate an object to be measured with measurement light. The measurement control device (1) acquires a distance I between the first measuring head and an inner peripheral surface of the hole of the object to be measured from the ranging device, (2) acquires a distance O between the second measuring head and an outer peripheral surface of the object to be measured from the ranging device, and (3) calculates the thickness of the object to be measured on the basis of the distance I, the distance O, and a distance between the first and second measuring heads.

According to the invention, it is possible to provide a system that can accurately measure the thickness of a shaft with a hole, and a method of manufacturing a shaft with a hole.

DETAILED DESCRIPTION OF THE PREFERRED EMBODIMENTS

Embodiments will be described below with reference to the drawings. Meanwhile, a hollow shaft, which includes a through-hole therein, will be described in the following embodiments by way of example, but objects to be measured including other holes, such as a blind hole, may also be used as an object.

First Embodiment

Figure 1:
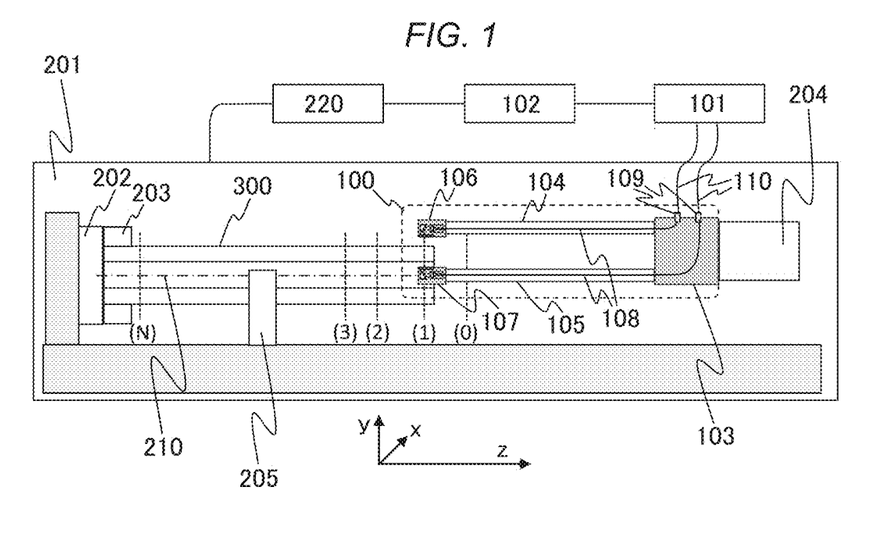
FIG. 1 is a diagram illustrating the structure of a measurement system of the invention.

FIG. 1 illustrates the entire structure of a measurement system of the invention that is installed on a machining apparatus 201. The measurement system is a system that includes a measuring instrument 100, a ranging device 101, and a measurement control device 102. Meanwhile, the measuring instrument 100 includes measuring heads 106 and 107, rods 104 and 105, and a measuring instrument base 103 as described later. The ranging device 101 generates measurement light, and sends the measurement light to connectors 109 of the measuring instrument base 103 through two optical fibers 110. The measuring instrument base 103 sends the measurement light to the measuring heads 106 and 107 through optical fibers 108. The measuring head 106 is a measuring head for an outer periphery, and the measuring head 107 is a measuring head for an inner periphery. The measuring heads 106 and 107 irradiate the outer peripheral portion and the inner peripheral portion of an object 300 to be measured (an example of the cross-section of a hollow shaft is illustrated in FIG. 1) with the measurement light, respectively; condense light, which is reflected by the object 300 to be measured and returns, again; and make the condensed light return to the ranging device 101 through the optical fibers 108, the connectors 109, and the optical fibers 110.

The measuring head 106 for an outer periphery is held on the measuring instrument base 103 by the rod 104 for an outer periphery and the measuring head 107 for an inner periphery is held on the measuring instrument base 103 by the rod 105 for an inner periphery, so that one measuring instrument 100 is formed as a whole. The measuring instrument 100 is mounted on a tool shaft (a carriage that holds a cutter and is moved) or a tailstock 204 of the machining apparatus 201 (for example, a lathe) and is horizontally held. For example, a hollow shaft, which is the object 300 to be measured, is mounted on a spindle (turning shaft) 202 of the machining apparatus 201 through a chuck 203. The object 300 to be measured may be supported from below and the left and right sides by a work rest 205 as necessary. Meanwhile, in a case where the machining apparatus 201 is a lathe including a cutter holder, the measuring instrument 100 may be mounted on the cutter holder. A case where the measuring instrument is mounted on the tailstock 204 will be described in the following description.

The positions of the measuring instrument 100 in an x direction and a y direction of FIG. 1 are adjusted by the tool shaft or the tailstock 204 so that a rotation axis 210 of the spindle 202 of the machining apparatus 201 (hereinafter, simply referred to as a rotation axis 210) and the center of the measuring head 107 for an inner periphery (the center of the xy cross-section of the measuring head 107 for an inner periphery to be inserted into the inner peripheral portion of the object 300 to be measured) substantially coincide with each other. The measuring instrument 100 is further moved in −z direction of FIG. 1 by the tool shaft or the tailstock 204, so that the measuring head 107 for an inner periphery is inserted into the object 300 to be measured and the measuring head 106 for an outer periphery is inserted to the outside of the object 300 to be measured while avoiding the work rest 205.

In a state where the measuring head 106 for an outer periphery and the measuring head 107 for an inner periphery are inserted up to an appropriate position of the object 300 to be measured, the object 300 to be measured is rotated by the rotation of the spindle 202. Distances to the outer peripheral surface and the inner peripheral surface of the object 300 to be measured are measured during the rotation by the measuring head 106 for an outer periphery and the measuring head 107 for an inner periphery, so that the measurement of the angular distributions of an inner diameter deviation, an outer diameter deviation, and a thickness at the position can be realized. At this time, in a case where positions where a user wants to measure the object 300 to be measured are present at N cross-sections, the above-mentioned operation may be performed at positions corresponding to numbers in parentheses, that is, (1), (2), (3), . . . , (N) illustrated in FIG. 1 in a state where the heads are inserted.

Here, the control of the machining apparatus 201 (for example, the position (more specifically, the rotation angle) of the hollow shaft and the position of the tailstock) is performed by an NC (numerical control) control device 220. While monitoring the position data on each shaft of the machining apparatus 201 obtained from the NC control device 220, the measurement control device 102 receives measured distance data, which is measured by and output from the ranging device 101, and performs measurement data processing. The rotation angle of the hollow shaft may be manually changed by a worker or the position of the measuring instrument 100 may be changed, but measurement accuracy is further improved in a case where the stable operation of the NC control device 220 is used. Further, NC data for correction/finish machining can be generated on the basis of measured data, such as the eccentricities of the internal form and the external form, which are obtained from the measurement control device 102.

<<Method of Measuring Distance>>

Here, various methods can be utilized as a method of measuring a distance, but one of them is a method of measuring time that is required in a case where light is applied to an object to be measured and returns. For example, examples of the method of measuring a distance include methods, such as OCT (Optical Coherence Tomography) and FMCW (Frequency Modulated Continuous Wave). In addition, a method of measuring time having passed until a pulse or burst light is received after the application of the pulse or burst light, such as a TOF (Time Of Flight) method, and methods of measuring the phase of a received signal after the application of continuously intensity-modulated light, such as a phase shift method and a ranging method using optical frequency combs, can be used as the method of measuring a distance.

Moreover, there is also a method of measuring defocus. An astigmatic focus error detection method, a knife edge method, and a conoscopic holography method can be used in addition to a confocal method with white light source to be described later.

In addition, there is also a so-called light stripe triangulation method of irradiating an object with laser light and obliquely measuring the position of a point, which shines on the surface of the object by scattering, to measure a distance by triangulation.

<<Measuring Head>>

Figure 2:
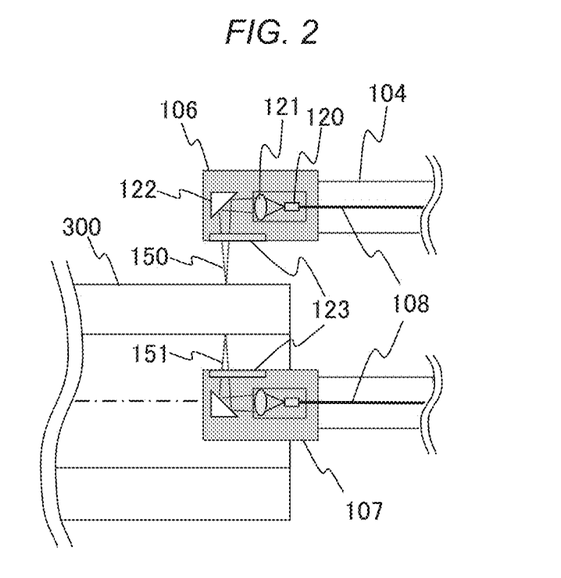
FIG. 2 is an enlarged view of a measuring head unit of the measurement system of the invention.

The measuring head 106 for an outer periphery and the measuring head 107 for an inner periphery will be described in detail below with reference to FIG. 2. Light, which is sent from each optical fiber 108, is emitted to a space from an optical fiber end 120. The emitted light is converted into condensed light by a lens 121. This light is bent by a reflective mirror 122, and is applied to the object 300 to be measured through a protection window 123. Light, which is reflected or scattered by the surface of the object to be measured, returns to the protection window 123, the reflective mirror 122, and the lens 121 along an original optical path, and returns to the optical fiber 108 from the optical fiber end 120. The above description is commonly applied to measurement light 150 of the measuring head 106 for an outer periphery and measurement light 151 of the measuring head 107 for an inner periphery. Meanwhile, since the reflective mirror 122 is employed, the optical fiber 108 extending from the optical fiber end 120 is made to extend substantially parallel to the rod 104 and does not need to be bent. As a result, since the heights of the measuring head 106 for an outer periphery and the measuring head 107 for an inner periphery can be made small, a hollow shaft including a hole having a small diameter can be measured. However, the reflective mirror may be omitted and the optical fiber 108 may be bent so that light is applied from the optical fiber end 120 in a vertical direction in the plane of paper.

Here, in the first embodiment, a lens for laser can be used as the lens 121, laser can be used as the measurement light, and OCT, FMCW, TOF, a phase shift method, a ranging method using optical frequency combs, and the like can be used to detect a change in the position of the surface of the object 300 to be measured as a distance.

In a case where a lens having a large chromatic aberration is used as the lens 121 and broadband light is used as the measurement light as another method, a focal length varies depending on a wavelength and light, which returns to the ranging device 101 from the optical fiber end 120 again, of the measurement light applied to the object 300 to be measured is light having a wavelength component exactly focused on the surface of a work. The ranging device is formed of a spectroscope to detect the wavelength of returning light, so that a distance can be obtained.

Further, still another method of measuring a distance will be described with reference to FIG. 3. Each of the measuring head 106 for an outer periphery and the measuring head 107 for an inner periphery has the following internal structure. Light emitted from a high-brightness light emitting element 140, such as a laser diode, is converted into convergent light by a lens 141 and is applied to an object 300 to be measured as measurement light 150 or 151. Light, which is scattered by the surface of the object 300 to be measured, is condensed by a lens 142 and forms an image on a linear image sensor 143. Since an image-formation position is changed depending on a distance to a position where light is applied to the object 300 to be measured, a distance can be measured.

Figure 3:
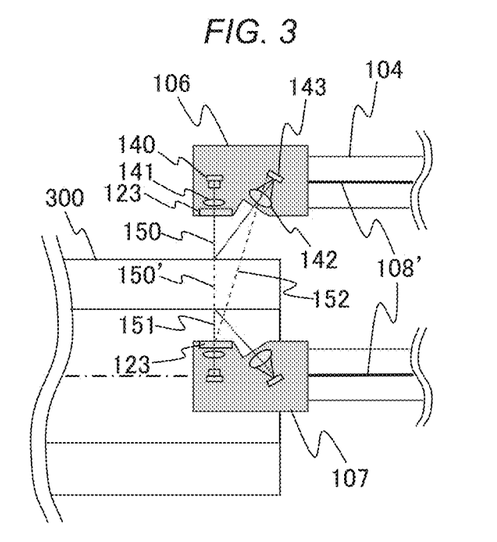
FIG. 3 is an enlarged view illustrating another example of the structure of the measuring head unit of the measurement system of the invention.

Measurement light 150' for an outer periphery in a case where the object 300 to be measured is not present is illustrated in FIG. 3 by a dotted line. As illustrated in FIG. 3, in a case where the object 300 to be measured is not present, the measurement light 150' is scattered by the surface of the protection window 123 of the measuring head 107 for an inner periphery, travels along a path 152 illustrated by a dotted line, and forms an image on the linear image sensor 143. Accordingly, an image-formation position on the linear image sensor 143, which faces the lower left side in FIG. 3, is shifted to the left side. A method of measuring a distance using the principle of triangulation in this way is generally called a light stripe triangulation method. Meanwhile, in the case of this structure, members, which connect the ranging device 101 to the measuring heads 106 and 107, are not the optical fibers 108 and 110 and drive signals of the high-brightness light emitting elements 140 and drive/readout signals of the linear image sensor 143 are transmitted and received through electric wires 108' instead.

Since all the above-mentioned methods of measuring a distance can measure a distance with light in a non-contact manner, the measuring heads held by the elongated rods 104 and 105 are not bent by contact unlike in the case of a contact-type measuring instrument. For this reason, all the above-mentioned methods of measuring a distance are preferred. In the methods of measuring a distance except for the light stripe triangulation method among them, the head has a very simple structure and can be easily made light and compact, and the wire is formed of one optical fiber and is also light. Accordingly, the methods of measuring a distance except for the light stripe triangulation method are more preferred in terms of holding the head by the end of the elongated rod and inserting the head into the narrow object 300 to be measured.

The positions of the inner peripheral surface and the outer peripheral surface of an elongated object to be measured (hollow shaft) could be simultaneously measured from the inside and outside by the above-mentioned structure. Meanwhile, the measuring heads 106 and 107 can be made light and compact as described above but the rods 104 and 105 are long. For this reason, it is preferable that each of the rods 104 and 105 is formed of a hollow pipe for a reduction in bending. Particularly, it is more preferable that a fiber-reinforced resin, such as CFRP (Carbon Fiber Reinforced Plastic), is used since the specific strength, which is a ratio of the modulus of elasticity to a specific weight, of the fiber-reinforced resin is higher than that of a stainless steel material and the vibration damping of the fiber-reinforced resin is also higher than that of a stainless steel material. The structures of two types of measuring heads 106 and 107 have been described above in the first embodiment, but the structure of the measuring heads 106 and 107 illustrated in FIG. 2 will be described in the first embodiment and a second embodiment and other embodiments to be described later by way of example or as the basis of expansion. However, the first embodiment and a second embodiment and other embodiments to be described later may employ the measuring heads 106 and 107 illustrated in FIG. 3 or may employ measuring heads 106 and 107 having other structures.

<<Ranging Device>>

Various configurations are considered as the hardware configuration of the ranging device 101 on the basis of a difference in the above-mentioned methods of measuring a distance. Meanwhile, in a case where light is sent to the measuring heads 106 and 107 through optical fibers as in FIG. 2 and the like, the ranging device 101 includes a laser light source. Although not illustrated, laser light generated from a laser light source is divided by a half mirror and one part of the laser light passes through the optical fiber and the measuring head, is reflected by the object to be measured, and returns to the ranging device 101 again in a case where, for example, OCT is employed. The other part of the laser light is reflected by a reference mirror, is superimposed on the returning laser light, and an interference beat signal is taken by a photodetector. AD conversion is performed; a distance is converted from the frequency of the beat signal (in other words, a distance is measured) by a logic function provided on, for example, FPGA; and distance data is output to the measurement control device 102.

<<Measurement Control Device>>

The hardware configuration of the measurement control device 102 is not illustrated, but a general-purpose computer including a processor (CPU), a memory, an auxiliary storage device, an input device, an output device, and a communication interface is used. A plurality of functions for processing for optically measuring the shapes of the inner and outer peripheries of a hollow shaft or a shaft with a blind hole and processing for generating NC data for correction/finish machining used to finish a shaft having high coaxiality of an inner periphery and an outer periphery are realized by the execution of a program stored in the auxiliary storage device. Meanwhile, a configuration where the respective functions realized by the processor (CPU) and the memory are dispersed in a plurality of integrated circuits or a configuration where a dedicated electronic circuit (DSP) realizes each function can also be employed. Meanwhile, the measurement control device may be the NC control device 220 or may be other device as illustrated in FIG. 1. The measurement control device 102 may transmit an instruction to change the rotation angle or the number of rotation of the spindle 202 and an instruction to change the position of the tailstock 204 for the change of the position of the measuring instrument 100 to the NC control device 220, as some kinds of processing that is required to perform the processing. Further, the measurement control device may transmit these instructions to a worker (for example, the display of these instructions or the transmission of a mail is considered).

Figure 5A:
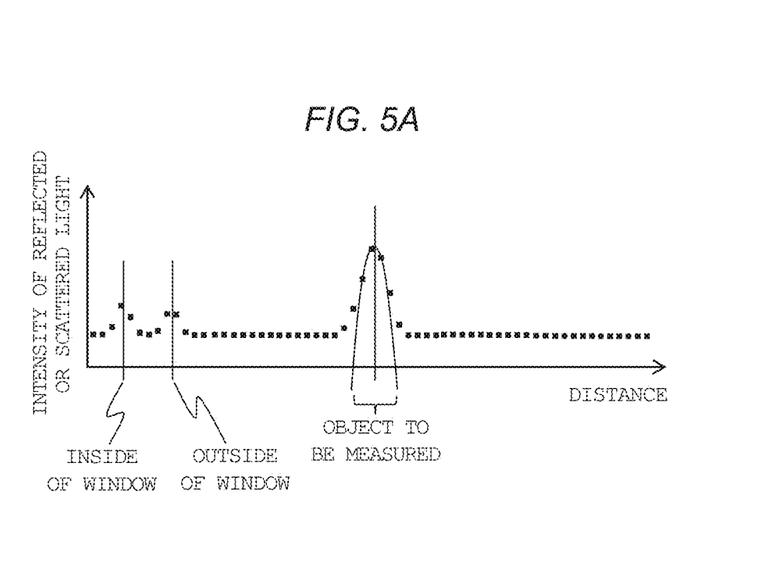
FIGS. 5A and 5B are diagrams illustrating examples of the output data of a ranging device of the invention.
Figure 5B:
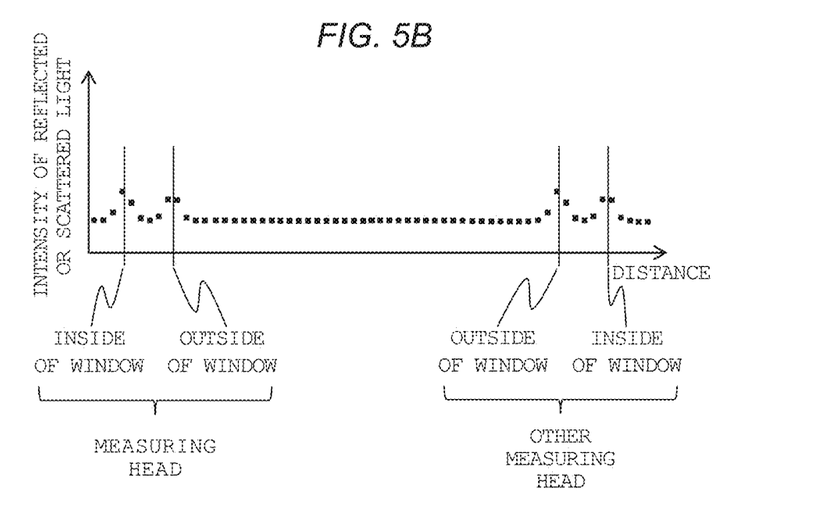

In addition, the signal processing of the ranging device 101 will be described with reference to FIGS. 5A and 5B. Even though any of the above-mentioned measurement principles is used, data illustrated in FIGS. 5A and 5B representing a relationship between a distance and the detected intensity of reflected or scattered light are obtained. The intensities of light reflected or scattered by the inside and outside of the protection window 123 and the object 300 to be measured are high as illustrated in FIG. 5A. Since intensity data is discrete with respect to a distance, the resolution of a distance is lowered in a case where only data on peaks are used. For this reason, in a case where at least three data points around each peak are selected and interpolation is performed, the resolution of a measured distance can be improved. For example, a quadratic function is applied to the data on the three points around each peak to obtain the positions of apexes thereof, so that the interpolation of a distance is performed. Alternatively, a method of performing the interpolation of a distance by obtaining the centroids of data points exceeding a certain threshold can be employed. Further, as the data point, the intensity of reflected or scattered light may be used, the square root thereof may be used, and the logarithm thereof may also be used.

Furthermore, a variation in the offset of a distance, which is caused by the ranging device 101, thermal expansion caused by temperature between the optical fiber ends 120 and the reflective mirror 122, or the like, is included in a distance to be measured. Meanwhile, the individual differences of the stiffness and mass of the rod and the measuring head are also related to a variation in the offset of a distance in addition to these. To cope with these, peaks caused by reflection and scattering on the surface of the protection window 123 of the measuring head are detected in addition to a distance to the object 300 to be measured and distances corresponding to the peaks are obtained and are deducted from the distance data on the object 300 to be measured. Accordingly, a distance from the surface of the protection window 123 can be accurately measured. The surfaces of the protection window are present at the inside and outside of the measuring head, that is, at two positions but the approximate positions thereof are determined in advance and are not significantly changed. Accordingly, in a case where the outside of the window is used as a reference (the outside of the window is used as a reference in this embodiment), the same interpolation processing as the object to be measured distance can be performed using measured data around the peak corresponding to this to calculate a reference distance. Antireflection coating corresponding to a specification wavelength may be performed only on the surface of the window, which is not used as a reference, to remove extra reflected light. Further, since the position of the window, which corresponds to a reference distance, is not suddenly changed, the distance data on the surface of the window may be temporally averaged to improve the accuracy of the reference distance. Meanwhile, a reference distance can be calculated while the inside of the window is used as a reference, but it is more preferable that the outside of the window is used as a reference since the position of the outside of the window can be accurately confirmed on the appearance of the measuring instrument 100.

Furthermore, in a case where the object 300 to be measured is not present, the other measuring head is detected as in FIG. 5B as illustrated by the measurement light 150' that is illustrated in FIG. 3 by a dotted line. Accordingly, in a case where this distance is calculated in the same manner as a manner that is used to obtain a distance to the surface of the window of the measuring head, a distance between the measuring heads 106 and 107 can be measured. A distance between the measuring heads 106 and 107 may be changed with time due to the deformation of the long rods 104 and 105 caused by environment, such as temperature. For this reason, in a case where the distance between the measuring heads 106 and 107 is measured at a position outside the hollow shaft 300, which is an object to be measured, at a position indicated by a number in parentheses, that is, (0) illustrated in FIG. 1 before the measurement of the object to be measured, an error in a thickness to be measured, which is caused by a change in the distance between the measuring heads 106 and 107, can be suppressed. Processing for measuring the distance (exactly, a distance S) (which may also be referred to as correction processing) can be performed without the removal of the measuring instrument 100 from the machining apparatus 201, that is, the correction processing can be performed regardless of a mounting error and a detachment error of the measuring instrument 100.

Figure 4:
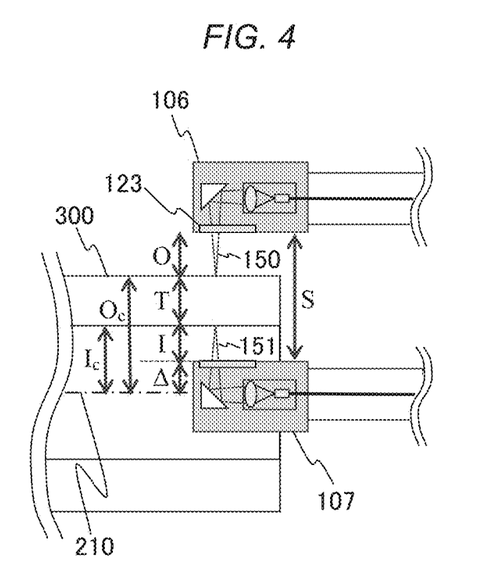
FIG. 4 is a diagram illustrating the definition of various distances between the measuring head unit of the measurement system and a work.

Next, the ranging processing will be described in detail with reference to FIG. 4. The distance S between the outer surfaces of the protection windows of the measuring head 106 for an outer periphery and the measuring head 107 for an inner periphery is obtained by ranging processing in a state where the object 300 to be measured is not present. In regard to ranging data in a state where the object to be measured is present, a distance O between the outer surface of the protection window 123 of the measuring head 106 for an outer periphery and the outer peripheral surface of the object 300 to be measured is obtained by the measuring head 106 for an outer periphery. Further, a distance I between the outer surface of the protection window 123 of the measuring head 107 for an inner periphery and the inner peripheral surface of the object 300 to be measured is obtained by the measuring head 107 for an inner periphery. Accordingly, a thickness T to be measured of the object 300 to be measured can be calculated from "T=S−O−I". In a case where a distance between the rotation axis 210 and the outer surface of the protection window of the measuring head 107 for an inner periphery is denoted by $\Delta$ (since the measuring instrument 100 is moved in −z direction and the measuring head 107 for an inner periphery is inserted into the hole of the object 300 to be measured so that the center of the measuring head 107 for an inner periphery substantially coincides with the rotation axis 210, the approximate value of $\Delta$ is determined from the shape of the measuring head 107 for an inner periphery.), a distance Ic between the rotation axis 210 and the inner peripheral surface of the object 300 to be measured can be calculated from "Ic=I+$\Delta$" and a distance Oc between the rotation axis 210 and the outer peripheral surface of the object 300 to be measured can be calculated from "Oc=S+$\Delta$−O".

Figure 7:
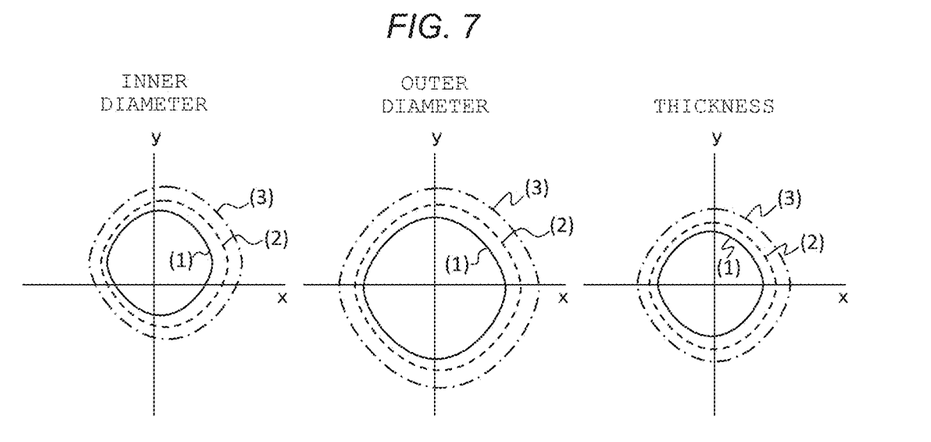
FIG. 7 is a diagram illustrating an example of an analysis/display method for the distributions of an inner diameter, an external form, and a thickness of the invention.

$O(\theta)$ and $I(\theta)$ are measured as a function of the rotation angle $\theta$ while the object 300 to be measured is rotated about the rotation axis 210. $T(\theta)$, which can be calculated from this result, is thickness distribution. $Oc(\theta)$ and $Ic(\theta)$ are plotted in the polar coordinates, so that the cross-sectional shape of the outer periphery and the cross-sectional shape of the inner periphery are obtained. This aspect is illustrated in FIG. 7. In this example, results measured on the cross-sections of (1), (2), and (3) illustrated in FIG. 1 are superimposed and illustrated in graphs (an example where a little difference is present in the shapes of three cross-sections is illustrated). Meanwhile, in order to emphasize errors, $Ic(\theta)$, $Oc(\theta)$, and $T(\theta)$ may not be plotted in the polar coordinates just as they are and errors $Ic(\theta)$-Io, $Oc(\theta)$-Oo, and $T(\theta)$-To from the reference distance may be plotted. These graphs may be displayed on a display of the measurement control device 102 to be easily understood by a user.

A circle is fitted on the data on each of the inner diameter and the outer diameter of FIG. 7 so that the evaluation value of each error becomes minimum (the approximation of a circle using a least-square method), and the central position and the diameter of each circle are obtained. As a result, the eccentricity of each circle, the direction of the eccentricity, and the diameter of each circle are obtained. Further, each of inner peripheral vibration and outer peripheral vibration can be calculated from a difference between the maximum value and the minimum value in one rotation of each of the inner and outer diameters.

Figure 8:
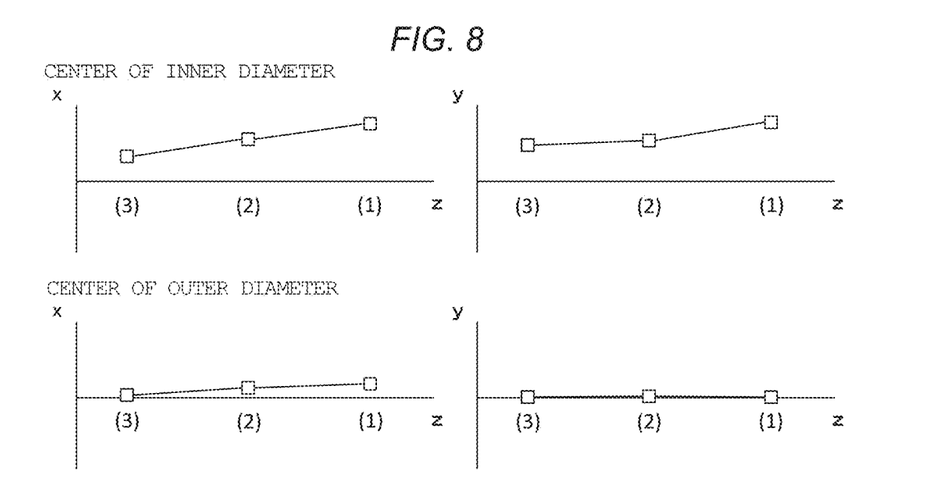
FIG. 8 is a diagram illustrating another example of the analysis/display method for the distributions of an inner diameter, an external form, and a thickness of the invention.

Furthermore, the central positions of the circles of the respective cross-sections obtained above are plotted so that a horizontal axis represents the coordinate of a cross-section [(1), (2), (3), . . . ,] and a vertical axis represents the X-coordinate or the Y-coordinate of the central position. As a result, the graphs of FIG. 8 are obtained. It is possible to see a state where the inner peripheral surface and the outer peripheral surface are eccentric and tilted form the graphs. These graphs may be displayed on the display of the measurement control device 102 to be easily understood by a user.

Figure 6:
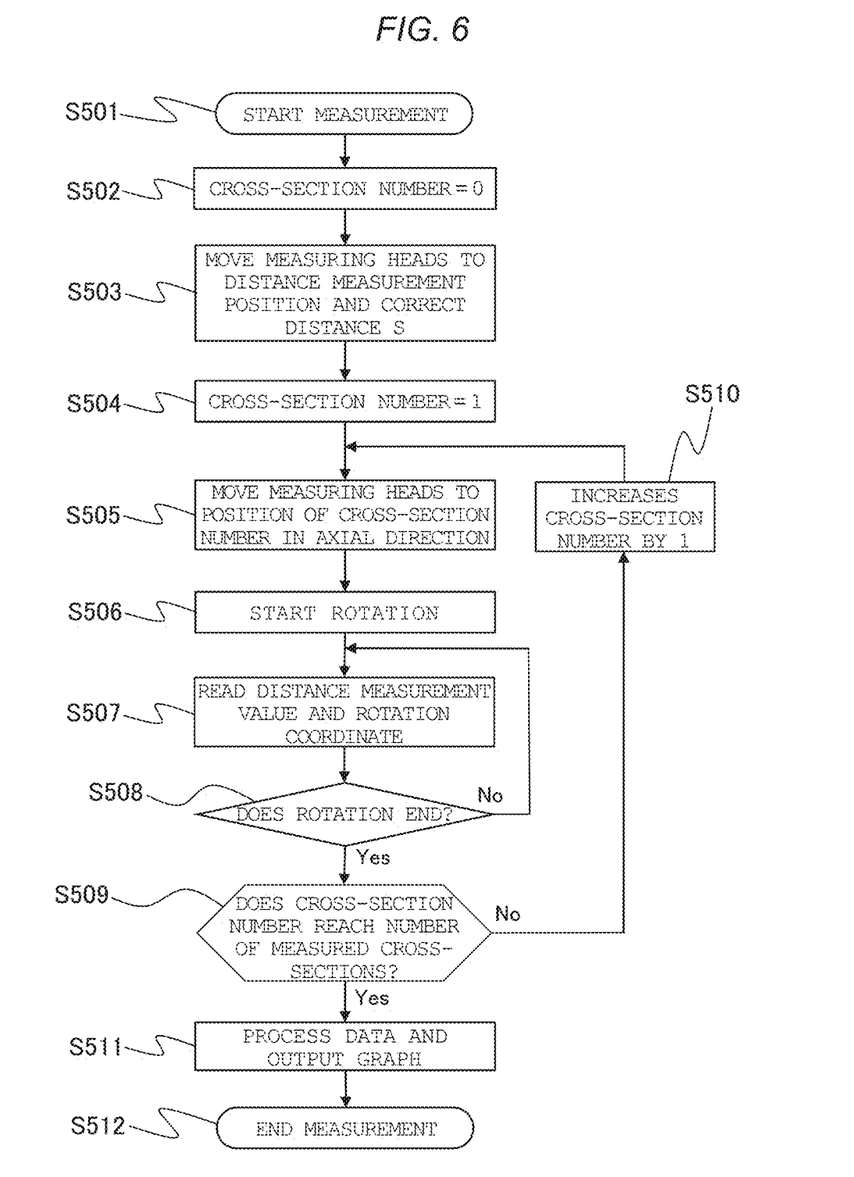
FIG. 6 is a diagram illustrating the flow of a measurement operation of the invention.

FIG. 6 illustrates an example of the flow of the measurement processing of the measurement control device 102.

In a case where measurement is started (S501), the measurement control device 102 sets a cross-section number (A cross-section number means a number in parentheses representing a measurement position illustrated in FIG. 1. The Z-coordinate of a cross-sectional position to be measured is defined for every cross-section number in advance. A position outside the object 300 to be measured is particularly defined as a cross-section number 0 to correct the distance S between the measuring heads.) to 0 first (S502).

In S503, the measurement control device 102 controls the movement of the tool shaft or the tailstock 204 in −z direction to position the measuring heads 106 and 107 of the measuring instrument 100 at the position of (0). After positioning, the measurement control device 102 measures the distance S between the outer surfaces of the protection windows of the measuring head 106 for an outer periphery and the measuring head 107 for an inner periphery by the ranging device 101. The measurement control device 102 records the correction value of the distance S.

In S504, the measurement control device 102 sets a cross-section number to 1.

In S505, the measurement control device 102 controls the movement of the tool shaft or the tailstock 204 in −z direction to position the measuring heads 106 and 107 of the measuring instrument 100 at the position of a Z-coordinate that is defined in advance to correspond to the variable value of a cross-section number.

In S506, the measurement control device 102 starts the constant-speed rotation of the spindle 202 of the machining apparatus 201.

In S507, the measurement control device 102 records the distance O between the outer surface of the window of the measuring head 106 for an outer periphery and the outer peripheral surface of the object 300 to be measured and the distance I between the outer surface of the window of the measuring head 107 for an inner periphery and the inner peripheral surface of the object 300 to be measured, which are obtained from the ranging device 101, every predetermined sample time (or at an interval δ of a predetermined rotation angle) so that the distances correspond to the rotation angle θ of the spindle 202.

In S508, the measurement control device 102 determines whether or not (θ, O, I) data corresponding to one rotation of the spindle 202 is recorded whenever recording (θ, O, I) in S507. If (θ, O, I) data corresponding to one rotation of the spindle 202 is recorded, the measurement control device 102 ends the rotation of the spindle 202 and makes the measurement processing proceed to S509. If (θ, O, I) data corresponding to one rotation of the spindle 202 is not yet recorded, the measurement control device 102 makes the measurement processing proceed to S507 again.

In S509, the measurement control device 102 determines whether or not a cross-section number reaches the number N of cross-sections of which the measurement is scheduled (the measurement control device 102 determines whether or not measurement of one rotation ends on all of N scheduled cross-sections). If a cross-section number does not reach the number N of cross-sections of which the measurement is scheduled, the measurement control device 102 makes the measurement processing proceed to S510. If a cross-section number reaches the number N of cross-sections of which the measurement is scheduled, the measurement control device 102 makes the measurement processing proceed to S511.

In S510, the measurement control device 102 increases a cross-section number by 1 and makes the measurement processing proceed to S505.

In S511, the measurement control device 102 perform data processing for the distributions of the inner diameter, the outer diameter, and the thickness at the N cross-sectional positions of the object 300 to be measured on the basis of all the recorded (θ, O, I) data of every cross-section and the correction value of the distance S; and outputs, for example, the graphs illustrated in FIGS. 7 and 8 to a display device or the like.

In S512, the measurement control device 102 ends the measurement processing.

Second Embodiment

Figure 9:
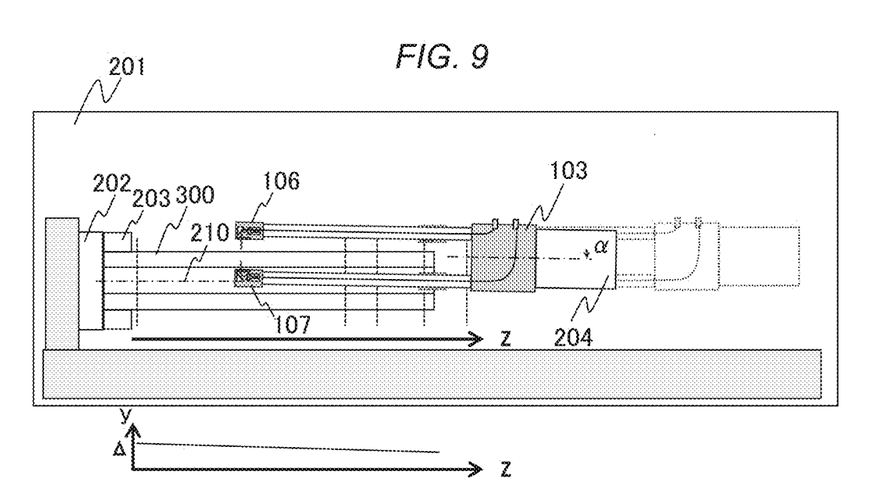
FIG. 9 is a diagram illustrating a problem in a case where an inner diameter and an outer diameter are to be measured in the measurement system of the invention.

Next, an embodiment where the values of inner and outer diameters are more accurately will be described with reference to FIGS. 9 and 10. The measuring instrument 100 is moved in −Z direction by the tool shaft or the tailstock 204 of the machining apparatus 201 and performs measurement, but pitching or yawing slightly occurs (α) with the movement of the tool shaft or the tailstock 204 in −Z direction. Since the rods 104 and 105 holding the measuring heads 106 and 107 are long even though α is usually an inclination not causing a problem, the positions of the measuring heads 106 and 107 in a Y direction are slightly changed as exaggeratedly illustrated in FIG. 9. The amount of change corresponds to Lα in a case where the length of each of the rods 104 and 105 is denoted by L. In a case where L is 1000 mm or more, Lα is a displacement of 0.1 mm although, for example, α is 100 microradians. This means that the value of an offset Δ between the rotation axis 210 and the surface of the protection window 123 of the measuring head 107 for an inner periphery defined in FIG. 4 is changed with the movement of the tool shaft or the tailstock 204 in -z direction. This aspect is illustrated in a graph on the lower side in FIG. 9. Even though Δ is changed, thickness distribution, outer peripheral vibration/inner peripheral vibration, and the value of eccentricity are not affected but the measured values of the outer and inner diameters are affected. For this reason, an error is caused.

Figure 10:
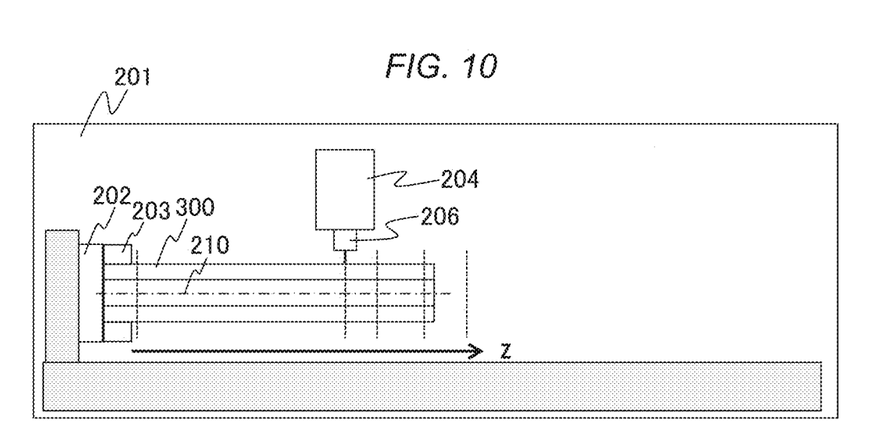
FIG. 10 is a diagram illustrating an embodiment where a touch probe is used together to accurately obtain an inner diameter and an outer diameter in the measurement system of the invention.

Accordingly, a method of correcting Δ by another method as illustrated in FIG. 10 has been devised. Here, a touch probe 206 (a touch probe is adapted to output a position on a space at the time when a gauge head touches an object to be measured.) is held on the tool shaft 204 instead of the measuring instrument 100. Accordingly, the position of the outer peripheral surface of the object 300 to be measured is measured, and Δ may be determined so that this value is equal to the position (Oc=S+Δ-O) of the outer peripheral surface of the object 300 to be measured, which is defined in FIG. 4 and measured by the measuring head 106 for an outer periphery. Since the values of S and O are known, the value of Δ is determined to be constant at every position in the Z direction. Preferably, the touch probe is moved to positions of (1) to (N) in the Z direction where a cross-section is to be measured by the measuring instrument 100 of the invention, and performs measurement.

In a case where a change in Δ is small during the movement of the tool shaft 204 in -Z direction, for example, Δ is measured at, for example, each of both ends of the object 300 to be measured by measurement using the touch probe and Δ at intermediate positions in the Z direction may be obtained from the linear interpolation of Δ obtained at the both ends of the object 300 to be measured. Alternatively, Δ is measured at each of three points, that is, both ends and the middle of the object 300 to be measured, and Δ at intermediate positions in the Z direction may be obtained from the measured Δ by the quadratic function interpolation. In addition, in a case where measurement accuracy where a change in Δ needs to depend on the measurement position on a Z axis is low, only the value of Δ not depending on the position in the Z direction, such as the deformation of the rod 104 for an outer periphery and the rod 105 for an inner periphery of the measuring instrument 100 with time and a variation in the grip of the measuring instrument 100 using the tool shaft or the tailstock 204, may be corrected. In this case, measurement using the touch probe may be performed at only one point on the outer periphery of the object 300 to be measured. Alternatively, the inner peripheral surface of the object 300 to be measured is touched by the touch probe at a position close to the end portion of the object 300 to be measured illustrated at (1) in FIG. 1, and the value of Δ may be determined so that this position is equal to "Ic=I+Δ".

Measurement for the correction of Δ has been performed by the touch probe 206 above. However, as another embodiment, a measuring head, which is similar to an inner/outer diameter measurement device and is formed of an optical non-contact displacement meter, may be prepared instead of the touch probe, may be held on the tool shaft 204 with a short distance like the touch probe 206, and may measure a distance instead of the touch probe.

Alternatively, as another embodiment, Oc is not measured by the touch probe, a worker measures an outer diameter with a micrometer or the like, and the value of Δ may be determined so that the value of the outer diameter is equal to the value of an outer diameter, which is obtained in a case where a circle is fitted on corresponding Oc(θ) data in the Z-coordinate. That is, the value of {(the outer diameter measured with a micrometer)-(the outer diameter obtained from circle fitting)}/2 may be added to the value of Δ. Δ may be corrected at all the points (1) to (N). However, the value of Δ may be corrected at only both ends to reduce effort and interpolation may be performed, or Δ may be measured at three points, that is, both ends and the middle and Δ at intermediate positions in the Z direction may be obtained from the measured Δ by the quadratic function interpolation. Alternatively, in a case where Δ does not need to depend on a position on the Z axis, an outer diameter or an inner diameter is measured at only one point and the value of Δ may be determined so that the measured value is equal to the value of the outer diameter or the inner diameter in a case where a circle is fitted.

Third Embodiment

In the second embodiment, an offset of the measured value of the inner diameter/the outer diameter is corrected using the measurement result of another measuring instrument, such as a touch probe or a micrometer. However, an embodiment where an offset of the measured value of the inner diameter/the outer diameter is corrected using the measuring instrument 100 is illustrated in FIGS. 11A, 11B, 11C, 11D, and 11E.

Two or more sets of optical fibers 108, optical fiber ends 120, lenses 121, mirrors 122, and protection windows 123 of the measuring head 107 for an inner periphery are provided so that additional measurement light 151' can be radially emitted. FIG. 11C illustrates a structure in the case of two sets thereof, FIG. 11D illustrates a structure in the case of four sets thereof, and FIG. 11E illustrates a structure in the case of three sets thereof.

Figure 11A:
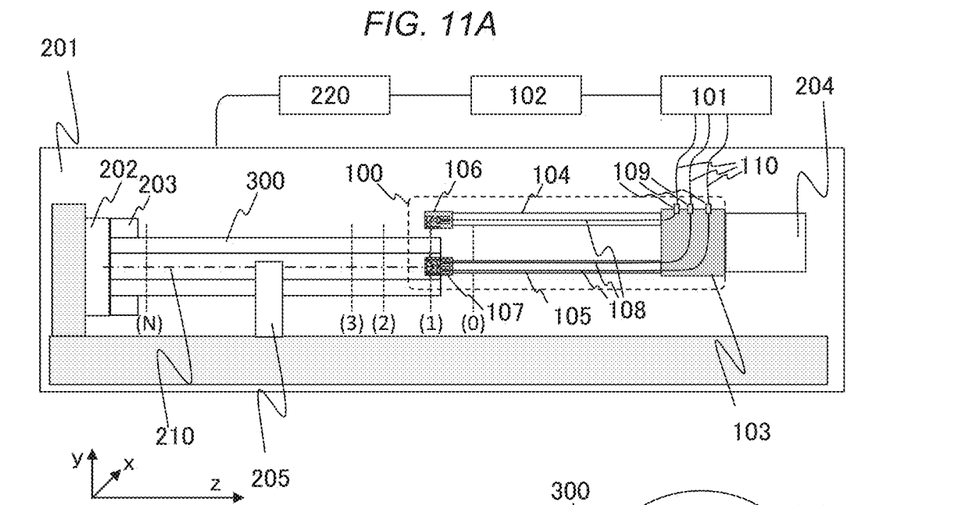
FIGS. 11A, 11B, 11C, 11D and 11E are diagrams illustrating an embodiment where additional measurement light is added in a measuring head for an inner periphery to accurately obtain an inner diameter and an outer diameter in the measurement system of the invention.
Figure 11B:
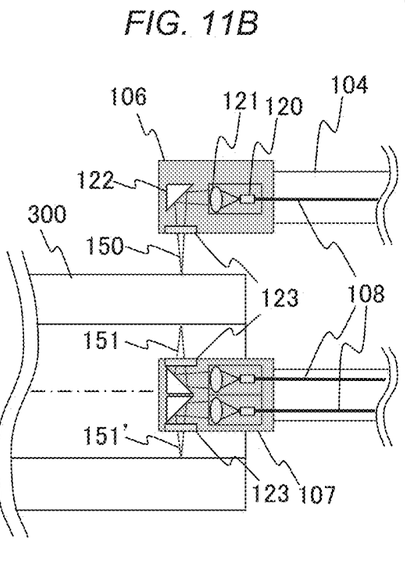
Figure 11C:
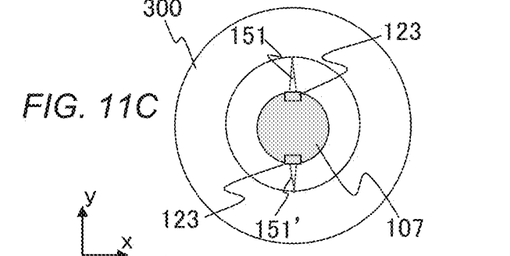

FIG. 11A is a diagram illustrating the entire structure in the case of two sets thereof. In this case, one optical fiber 108 for an outer periphery and two optical fibers 108 for an inner periphery, that is, optical fibers 108 of a total of three channels are relayed to connectors 109 and are connected to the ranging device 101 through optical fibers 110 of three channels. The numbers of the optical fibers 108 and 110 and the connectors 109 are increased as much as an increase in the number of pieces of measurement light 151' for an inner periphery. Meanwhile, the connectors 109 and the optical fibers 110 are prepared as many as the number of pieces of measurement light in FIG. 11A, but it goes without saying that a connector and a cable capable of connecting a plurality of optical fiber channels may be used.

In the case of FIG. 11C, the measured value of the inner diameter is obtained from the sum of the sum of the distance measurement values of measurement light 151 and 151' and a distance between the surfaces of the protection windows 123. In this case, it is premised that the position of the measuring head 107 for an inner periphery in a horizontal direction (x direction) substantially coincides with the center of the inner periphery. In a case where an error of the measured value of the inner diameter caused by the shift of the central position cannot be ignored, measurement is performed while the measuring instrument 100 is moved in the horizontal direction (x direction) by a measuring instrument holder, the tool shaft, and the tailstock 204 so that measurement is performed at a position where the calculated value of the inner diameter is largest.

Figure 11D:
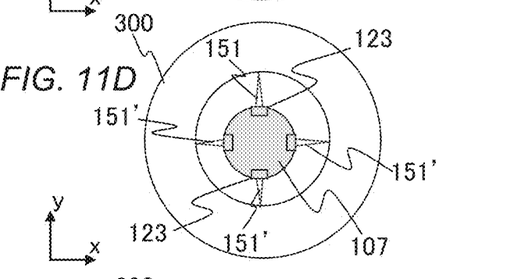
Figure 11E:
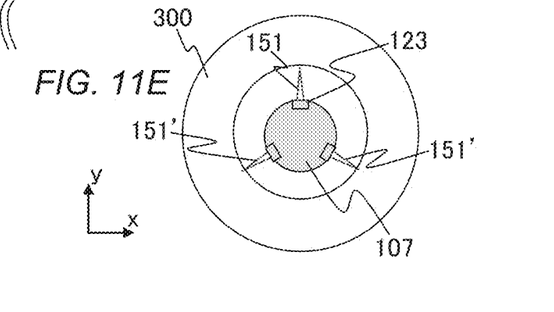

In the cases of FIGS. 11D and 11E, data, which is obtained from the sum of the distance measurement value of each measurement light (151, 151') and a radial distance between the surface of the protection window 123 and the center of the measuring head 107 for an inner periphery, are obtained as many as the number of pieces of the measurement light.

That is, the direction of each measurement light and a radial distance between the center of the measuring head and a position where the inner periphery is irradiated with measurement light are obtained. In a case where a circle is fitted on these data plotted in the polar coordinates, the value of the inner diameter is accurately obtained.

The values of the inner diameter at the respective measurement positions (1), (2), . . . , (N), which are obtained in this way, can be used to determine the value of $\Delta$ so that the radius of the inner diameter is equal to "Ic=I+$\Delta$". In a case where the outer diameter is calculated from the measured data of the measuring head 106 for an outer periphery by using this value, the outer diameter can also be accurately calculated.

Fourth Embodiment

Next, an embodiment of machining, which utilizes the measurement result of the measurement system of the invention, will be described with reference to FIGS. 12A, 12B, and 12C. Components common to the components described in FIG. 1 are not illustrated but a tool 290 is gripped by the tool shaft 204. The tool 290 may be a cutter (cutting tool) or may be a rotating tool. In a case where the cutting tool is used, machining is called turning. In a case where the rotating tool is used, machining is called turn milling.

Figure 12A:
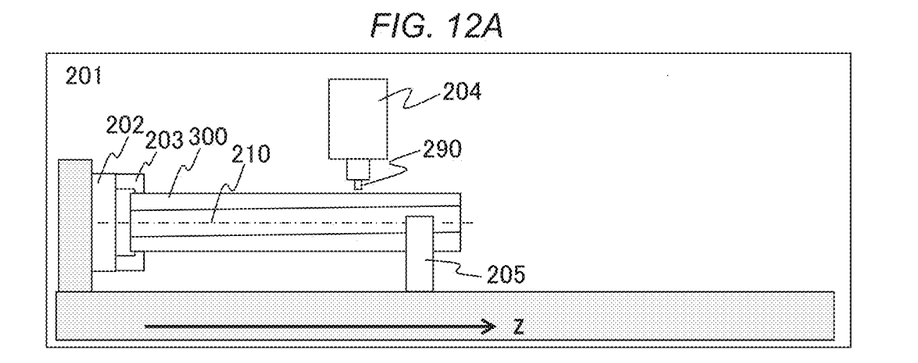
FIGS. 12A, 12B, and 12C are diagrams illustrating an embodiment of a method of machining an outer periphery by using the measurement result of the measurement system of the invention.

FIG. 12A schematically illustrates a case where the inner periphery a work (a hollow shaft in this embodiment) 300 is eccentric to the outer periphery of the work upward, and the eccentricity of the inner periphery is increased toward the right side of the work. This state occurs in a case where the central axis of the inner periphery of the work does not coincide with the rotation axis 210 of the spindle 202 (the central axis of the outer periphery of the work) during the cutting of the outside of the work. A case where the work 300 is mounted on the spindle 202 again after the cutting of the inner periphery or another cutting method without the rotation of the spindle 202 is used is considered as one example of a cause. In a case where the measurement system of the invention is used, the eccentric state between the central axis of the outer periphery and the central axis of the inner periphery (for example, eccentricity (which may include the direction of eccentricity)) can be accurately measured on the machining apparatus 201. Generally, most of hollow shaft components and shaft components with blind holes need to be machined without such eccentricity. In a case where the invention is used, machining can be performed according to the eccentricity of the inner periphery so that the axis of the inner periphery and the axis of the outer periphery are coaxial with each other (that is, the central axes coincide with each other). This embodiment will be described.

Figure 12B:
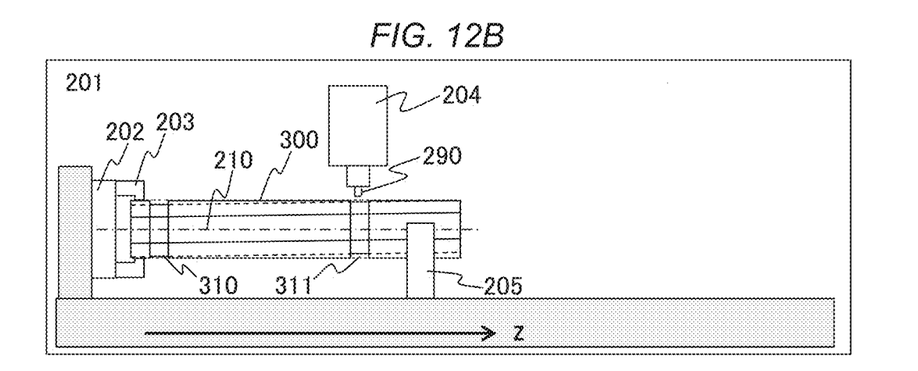

FIG. 12B illustrates a method of reducing eccentricity by performing eccentric turning or eccentric turn milling. The tool 290 machines a chuck face 310 while being moved in a vertical direction of FIG. 12B in synchronization with the angle of the spindle 202 so that the central axis of the chuck face 310 and the central axis of an inner peripheral surface corresponding to the chuck face 310 (an inner peripheral surface included in a cylinder in a case where the cylinder including the chuck face on a side surface is defined) coincide with each other (or eccentricity between the central axes is reduced). A work rest-receiving surface 311 is also machined likewise. Next, in a case where the chuck face 310 is gripped by the chuck 203 and the work rest-receiving surface 311 is received by the work rest 205, the rotation axis of the spindle 202 and the central axis of the inner periphery can be made to coincide with each other. In this state, turning or turn milling is performed over the entire outer peripheral surface of the work 300. A hollow shaft 300 having high coaxiality of inner and outer peripheries can be produced by such an embodiment.

Next, another embodiment, which produces a shaft having high coaxiality of inner and outer peripheries, will be described with reference to FIG. 12C. A machining apparatus 201 in this case is a machining apparatus that includes chuck mechanisms at both ends thereof. The adjustment distances of chucks 203 and 203' are adjusted so that the axis of an inner peripheral surface obtained by the measurement system of the invention coincides with the rotation axis 210, and the chucks are moved. In this state, turning or turn milling is performed over the entire outer peripheral surface of the work 300. A hollow shaft 300 having high coaxiality of inner and outer peripheries can also be produced by such an embodiment.

Figure 12C:
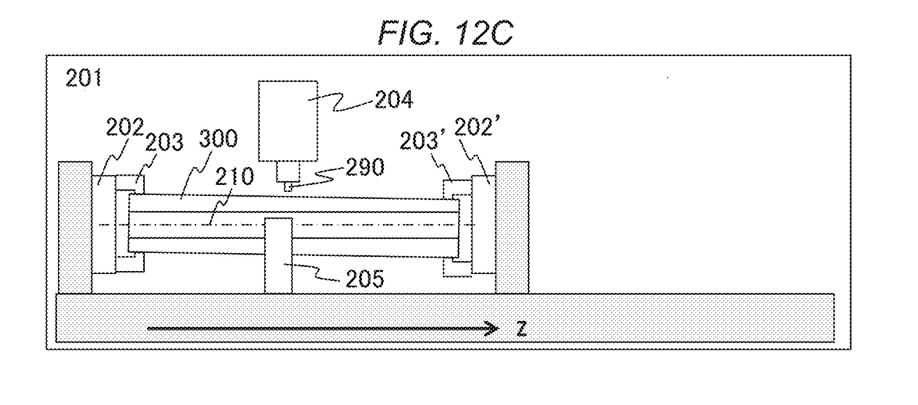

Meanwhile, in both the embodiments of FIGS. 12B and 12C, it goes without saying that the chuck face and the work rest-receiving surface, of which the outer peripheries are not yet machined, need to be finally subjected to finish machining.

Fifth Embodiment

In the description of FIG. 1 of the first embodiment, 201 denotes the machining apparatus, and the machining apparatus moves the measuring instrument 100 by the tool shaft or the tailstock 204 to insert the measuring instrument 100 into the object to be measured (a hollow shaft in the first embodiment) 300, and rotates the object to be measured by the turning shaft 202 to measure the object to be measured. However, as another embodiment, the machining apparatus 201 may be formed as a dedicated measurement apparatus. In this case, as in a case where the machining apparatus is formed of a machining apparatus, the machining apparatus may move the measuring instrument 100 by the measuring instrument holder 204 to simultaneously realize the measurement of an inner diameter and an outer diameter. However, as another structure, the machining apparatus may move the spindle 202 of an object to be measured in the Z direction without the movement of the measuring instrument 100 to measure each cross-section.

What is claimed is:

1. A measurement system that measures a distance from an object to be measured including a hole and fixed to a spindle of a machining apparatus, the measurement system comprising:
    a measuring instrument;
    a measurement control device; and
    a ranging device that is connected to the measurement control device,
    wherein the measuring instrument includes a base that is to be fixed to a tool shaft, a cutter holder, or a tailstock of the machining apparatus, a first rod that is connected to the base, a second rod that is connected to the base, a first measuring head that is fixed to the first rod and irradiates the object to be measured with measurement light emitted from an end of a first optical fiber connected to the ranging device, and a second measuring head that is fixed to the second rod and irradiates the object to be measured with measurement light emitted from an end of a second optical fiber connected to the ranging device,
    the ranging device includes a light source of the measurement light and measures a distance to the object to be measured on the basis of reflected or scattered light of the measurement lights returning from the first and second measuring heads, and the measurement control device executes a first operation for acquiring a distance I between the first measuring head and an inner peripheral surface of the hole of the object to be measured from the ranging device, a second operation for acquiring a distance O between the second measuring head and an outer peripheral surface of the object to be measured from the ranging device, and a third operation for calculating the thickness of the object to be measured on the basis of the distance I, the distance O, and a distance between the first and second measuring heads.

2. A measurement system that measures a distance from an object to be measured including a hole and fixed to a spindle of a machining apparatus, the measurement system comprising:

a measuring instrument;
a measurement control device; and
a ranging device that is connected to the measurement control device, wherein the measuring instrument includes a base that is to be fixed to a tool shaft, a cutter holder, or a tailstock of the machining apparatus, a first rod that is connected to the base, a second rod that is connected to the base, a first measuring head that is fixed to the first rod and includes a high-brightness light emitting element and a linear image sensor forming an image with scattered light of measurement light applied from the high-brightness light emitting element, and a second measuring head that is fixed to the second rod and includes a high-brightness light emitting element and a linear image sensor forming an image with scattered light of measurement light applied from the high-brightness light emitting element, the ranging device measures a distance to the object to be measured on the basis of information about a position where the image is formed on the linear image sensor, and the measurement control device executes a first operation for acquiring a distance I between the first measuring head and an inner peripheral surface of the hole of the object to be measured from the ranging device, a second operation for acquiring a distance O between the second measuring head and an outer peripheral surface of the object to be measured from the ranging device, and a third operation for calculating the thickness of the object to be measured on the basis of the distance I, the distance O, and a distance between the first and second measuring heads.

3. The measurement system according to claim 1,
wherein the first measuring head includes a protection window that transmits measurement light,
the second measuring head includes a protection window that transmits measurement light,
the distance I is a distance from the protection window of the first measuring head,
the distance O is a distance from the protection window of the second measuring head, and
the measurement control device executes a fifth operation for acquiring a measured distance of a distance between the protection window of any one of the first and second measuring heads and the protection window of the other measuring head, and a sixth operation for correcting the distance between the first and second measuring heads.

4. The measurement system according to claim 3,
wherein distances from the first and second measuring heads, which are output from the ranging device, are distances from outer surfaces of the protection windows of the respective measuring heads.

5. The measurement system according to claim 1,
wherein the measurement control device transmits an instruction to rotate the spindle at a predetermined number of rotation or to rotate the spindle up to a predetermined rotation angle to an NC control device of the machining apparatus or a worker of the machining apparatus before executing the first to third operations, and transmits an instruction to move the tool shaft, the cutter holder, or the tailstock along a rotation axis of the spindle of the machining apparatus to the NC control device of the machining apparatus or the worker of the machining apparatus at the time of executing the first to third operations.

6. The measurement system according to claim 1,
wherein the first measuring head applies measurement light in a plurality of directions,
the ranging device measures distances to the object to be measured in the plurality of directions, and
the measurement control device calculates an inner diameter of the hole of the object to be measured by fitting the distances in the plurality of directions to a circle.

7. A measurement system that measures a distance from an object to be measured including a hole and fixed to a chuck, the measurement system comprising:

a measuring instrument;
a measurement control device; and
a ranging device that is connected to the measurement control device, wherein the measuring instrument includes a base that is to be fixed to a moving mechanism, a first rod that is connected to the base, a second rod that is connected to the base, a first measuring head that is fixed to the first rod and irradiates the object to be measured with measurement light emitted from an end of a first optical fiber connected to the ranging device, and a second measuring head that is fixed to the second rod and irradiates the object to be measured with measurement light emitted from an end of a second optical fiber connected to the ranging device, the ranging device includes a light source of the measurement light and measures a distance to the object to be measured on the basis of reflected or scattered light of the measurement lights returning from the first and second measuring heads, and the measurement control device executes a first operation for acquiring a distance I between the first measuring head and an inner peripheral surface of the hole of the object to be measured from the ranging device, a second operation for acquiring a distance O between the second measuring head and an outer peripheral surface of the object to be measured from the ranging device, and a third operation for calculating the thickness of the object to be measured on the basis of the distance I, the distance O, and a distance between the first and second measuring heads.

8. The measurement system according to claim 2,
wherein the first measuring head includes a protection window that transmits measurement light,
the second measuring head includes a protection window that transmits measurement light,
the distance I is a distance from the protection window of the first measuring head, the distance O is a distance from the protection window of the second measuring head, and the measurement control device executes a fifth operation for acquiring a measured distance of a distance between the protection window of any one of the first and second measuring heads and the protection window of the other measuring head, and a sixth operation for correcting the distance between the first and second measuring heads.

9. The measurement system according to claim 8,
wherein distances from the first and second measuring heads, which are output from the ranging device, are distances from outer surfaces of the protection windows of the respective measuring heads.

10. The measurement system according to claim 2,
wherein the measurement control device transmits an instruction to rotate the spindle at a predetermined number of rotation or to rotate the spindle up to a predetermined rotation angle to an NC control device of the machining apparatus or a worker of the machining apparatus before executing the first to third operations, and transmits an instruction to move the tool shaft, the cutter holder, or the tailstock along a rotation axis of the spindle of the machining apparatus to the NC control device of the machining apparatus or the worker of the machining apparatus at the time of executing the first to third operations.

11. The measurement system according to claim 2,
wherein the first measuring head applies measurement light in a plurality of directions, the ranging device measures distances to the object to be measured in the plurality of directions, and the measurement control device calculates an inner diameter of the hole of the object to be measured by fitting the distances in the plurality of directions to a circle.

* * * * *